ELECTRIC SWITCHING DEVICES

Filed Feb. 2, 1955 3 Sheets-Sheet 1

Inventor
Harry Norman Green
By Harry M. Saragovitz
Attorney

ELECTRIC SWITCHING DEVICES

Filed Feb. 2. 1955 3 Sheets-Sheet 2

Inventor
Harry Norman Green
By Harry M. Saragovitz
Attorney

ELECTRIC SWITCHING DEVICES

Filed Feb. 2, 1955

Inventor
Harry Norman Green
By Harry M. Saragovitz
Attorney 2,863,021
Patented Dec. 2, 1958

2,863,021

ELECTRIC SWITCHING DEVICES

Harry Norman Green, Farnborough, England, assignor to The Minister of Supply in Her Majesty's Government of the United Kingdom of Great Britain and Northern Ireland, London, England Application February 2, 1955, Serial No. 488,002

4 Claims. (Cl. 200—114)

This invention relates to electric switching devices and has for an object to provide simple and reliable switching devices for use automatically to modify e. g. especially to close, a number of circuits in rapid succession at predetermined time intervals in cases where the necessity to set up the device prior to each such operation can be accepted.

An electric switching device according to the invention comprises essentially a plurality of switches, a plurality of fusible elements holding them open against spring influence, and connections such that, upon establishment of connection with a battery or other source, the first fusible element fuses and so allows the first switch to close and thus connect to the source the second fusible element, which in turn then fuses and so allows the second switch to close and thus connect the third fusible element through the already closed first switch to the source, and so on, depending upon the number of switches in any particular case.

It will be apparent that the number of switches and fusible elements may be one less than the number of circuits to be modified, the modifying of the first circuit being effected by the establishment of connection to the battery or other source. Thus, for two circuits, only one switch with a fusible element holding it open is necessary.

The switches may be of simple single pole on-off type in which case the device will be suitable for closing or completing in succession the connections of a plurality of circuits across a battery or other source, for which purpose each circuit as such may be connected across a corresponding fusible element by way of the moving contact of the corresponding switch.

For successive modification of circuits, other than simply closing as above, the switches may control appropriate relays or some or all of the switches may be of two or multi-pole type, the additional pole or poles performing such circuit modifications as may be required.

The invention is illustrated by the accompanying diagrammatic drawings of which:

Figure 1:
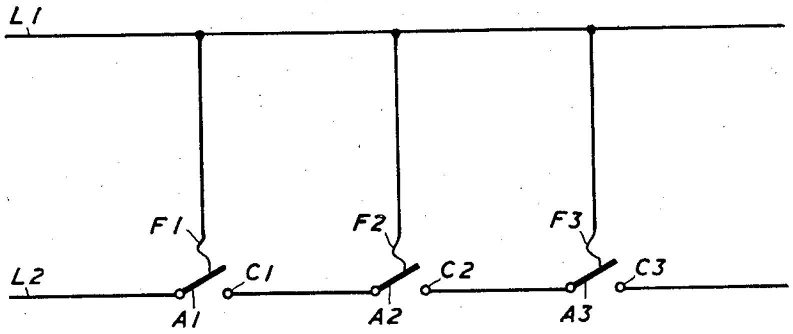
Figure 1 is a basic circuit diagram.

As shown in Figure 1 a device according to the invention comprises basically a plurality of simple on-off switches $S_1$, $S_2$, $S_3$, . . . a plurality of fusible elements such as short lengths of fuse wire, $F_1$, $F_2$, $F_3$ . . . . These switches have spring-closed moving contact arms $A_1$, $A_2$, $A_3$, . . . (each of which may in practice be simply a piece of springy metal strip or wire anchored firmly at one end) held clear of the fixed contacts $C_1$, $C_2$, $C_3$, . . . by the fusible elements $F_1$, $F_2$, $F_3$, . . . respectively. Those ends of the fusible elements $F_1$, $F_2$, $F_3$, . . . remote from the switches $S_1$, $S_2$, $S_3$, . . . are all connected to one supply lead $L_1$ and the moving contact of the first switch $S_1$ is connected with another supply lead $L_2$ and the fixed contact $C_1$, $C_2$, $C_3$, . . . of each switch is connected with the moving contact $A_2$, $A_3$, . . . of the next following switch.

In operation, upon the supply leads $L_1$, $L_2$ being connected, say through a manually operable switch, not shown, with a battery or other source, not shown, the first fusible element $F_1$ fuses after a time interval dependent (for any particular source voltage) upon its nature and the first switch $S_1$ closes, thereby connecting the second fusible element $F_2$ via the moving contact of switch $S_2$ across the supply leads, whereupon, again after a time interval dependent upon its nature, the fusible element $F_2$ fuses and the switch $S_2$ closes, thereby connecting the third fusible element $F_3$ via the switch $S_1$ and the moving contact of switch $S_3$ with the source, and so on.

Figure 2:
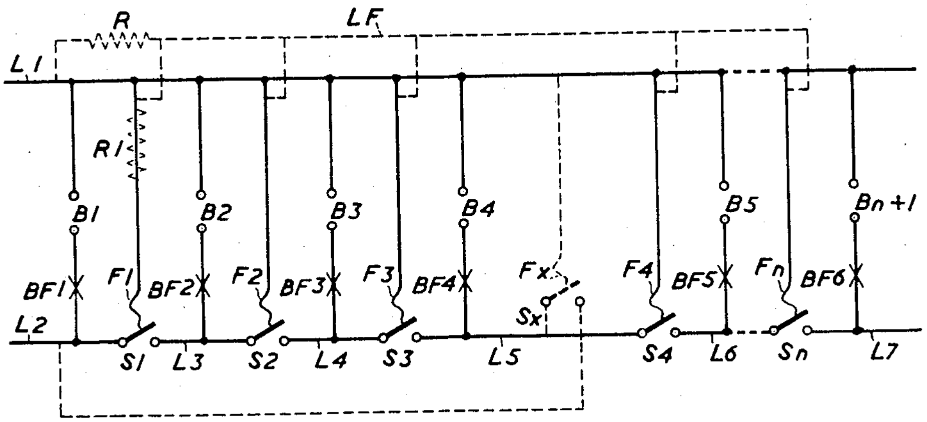
Figure 2 is the circuit diagram of one form of switching device according to the invention for closing a plurality of circuits in succession.

The circuit of Figure 2 is the same as Figure 1 with the addition of a plurality of circuits $B_1$, $B_2$, $B_3$, . . . to be closed in succession connected between the supply lead $L_1$ and the junction of switches $S_1$ and $S_2$, between the supply lead $L_1$ and the junction of switches $S_2$ and $S_3$, and so on, respectively. It will be seen that the automatic action is the same as in Figure 1 with the addition that each time a fusible element is connected across the supply $L_1$, $L_2$ leads so also is a corresponding circuit connected across said leads. When there is a large number of circuits so that the later ones are connected with the supply lead $L_2$ through a large number of switches in series, the inclusion of unduly high switch contact resistance in the circuit may be avoided by providing additional connections to the supply lead $F_1$ at one or more points in the chain of series connected switches. For example, as shown in broken lines in Figure 2, an additional switch $S_x$ has its fixed contact connected with the supply lead $L_2$ and its moving contact connected with the junction of switches $S_3$ and $S_4$ and normally held open by a fusible element $F_x$ connected with the supply lead $L_1$. When, therefore, the switch $S_3$ closes, not only does the fusible element $F_4$ fuse and allow the switch $S_4$ to close, but the additional fusible element $F_x$ also fuses and allows the additional switch $S_x$ to close and connect the switch $S_4$ to the supply lead $L_2$, thus short-circuiting the switches $S_1$, $S_2$ and $S_3$.

In cases where the circuits connected at $B_1$, $B_2$, $B_3$, . . . are such that it is desirable that the voltage applied to fuse the fusible elements $F_1$, $F_2$, $F_3$, . . . should be less than that supplied to said circuits, said fusible elements may be connected to the supply lead $F_1$ through a resistance R via lead $F_L$ as indicated by broken lines at the upper part of Figure 2. Again, although the time intervals between successive switching operations may be made to differ one from another by the use of appropriately different (e. g. different gauge wire) fusible elements $F_1$, $F_2$, $F_3$, . . . such difference may be effected, or increased, by connecting the or each fusible element concerned to the supply lead $F_1$ via an individual resistance, for example the resistance $R_1$ indicated in broken lines in the case of the fusible element $F_1$.

In Figure 2 fuses for the branch circuits $B_1$, $B_2$, . . . are indicated at $BF_1$, $BF_2$, . . ., respectively.

The simple circuit closing switching device shown in Figures 3 to 8 of the drawings is designed as an expendible plug-in unit (which, however, is usable again when not expended, upon replacement of the fusible elements) as part of an aircraft rocket projector for firing six rockets (in the example shown in Figures 3 to 7) in rapid succession, the detonators of the rockets being included in the branch circuits $B_1$, $B_2$, . . .

Figure 4:
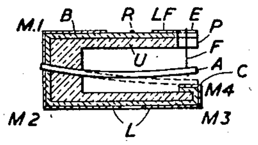
Figure 7:
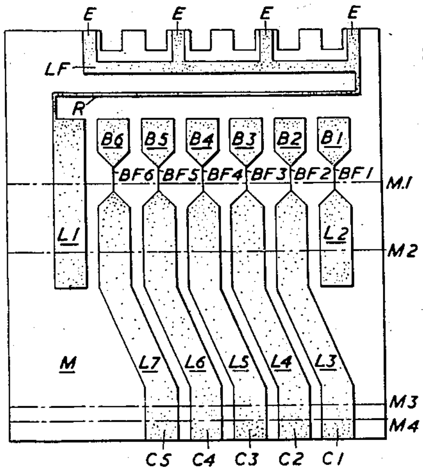
Figure 8:
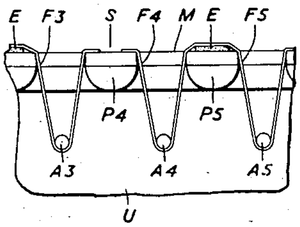

The device comprises a U section body U, Figure 4, moulded from insulating material with spring wires inserted into the base and extending between the "limbs" thereof to constitute switch arms $A_1$, $A_2$, . . ., and a piece of thin sheet material M, Figure 7, having the circuit of the device applied thereto by means of a "printed circuit" technique.

The same reference numerals indicate the same parts in all the figures of the drawings.

The device of Figures 3 to 8 includes everything that is in Figure 2 except the upper connections of the branch circuits to the supply lead $L_1$, which are more conveniently provided extraneously, and the additional switch and fusible elements $S_x$ and $F_x$ and their connections. It will readily be understood that these latter may be incorporated in a device like that of Figures 3 to 6.

The printed sheet M of Figure 7 incorporates, as shown, all the circuit components of the device, including the lead LF and the resistance R through which the fusible elements $F_1$, $F_2$, . . . are connected with the supply $F_1$ but with the exception of the switch arms $A_1$, $A_2$, . . . and fusible elements $F_1$, $F_2$, . . .

The switch arms $A_1$, $A_2$, . . . are in the form of spring wires inserted at an angle into the U-section body U and extending between the limbs thereof as clearly shown in the case of the arm $A_1$ in Figure 4.

Figure 3:
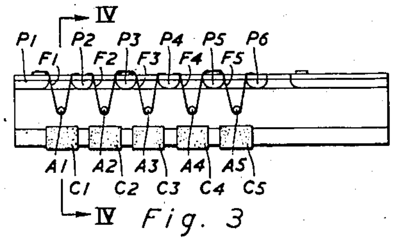
Figures 3 and 4 are side and end elevations.

The printed sheet M is folded four times upon itself, along the lines $M_1$, $M_2$, $M_3$ and $M_4$, Figures 7 and 4, and secured by adhesive around the body U with that margin of the sheet M bearing the fixed contacts $C_1$, $C_2$, . . . at the inner face of the lower limb of the body U as shown in Figure 4, so that said fixed contacts are presented (downwardly Figure 4) to the respective contact arms $A_1$, $A_2$, . . . see Figure 3 (in which the contact arms $A_1$, $A_2$, . . . appear above the respective fixed contacts $C_1$, $C_2$, . . . ). The margin of the limb of the U-section body U that is uppermost in Figure 4 is gapped (as is also the corresponding margin of the printed sheet M) opposite the fixed contacts $C_1$, $C_2$, . . . on the margin of the opposite limb, and it will be seen (most easily from Figure 7) that extensions E, E, . . ., of the conductor LF extend between alternate gaps.

After the printed sheet M is fixed in position on the body U, a length of fuse wire is looped alternately around the projections $P_1$, $P_2$, . . . left by the gaps in one margin of the body U and the ends and around the ends of the wire contact arms $A_1$, $A_2$ to hold the latter against their own springiness clear of said fixed contacts $C_1$, $C_2$, . . . see particularly Figures 3 and 4. This fuse wire is then either soldered or spot-welded to the extensions E, E, . . . of the conductor at alternate projections $P_1$, $P_3$, $P_5$ and secured firmly by adhesive to the intervening projections $P_2$, $P_4$, $P_6$ between the extensions E, E, . . . of the conductor LF. The wire is then severed at the projections $P_2$, $P_4$, $P_6$ as shown more clearly in the enlarged Figure 8 where one severing is indicated at S. In this way, each switch arm $A_1$, $A_2$, . . . is held "off" by a "V" of fuse wire of which V only one limb carries current and constitutes the corresponding fusible element $F_1$, $F_2$, . . .

Figure 5:
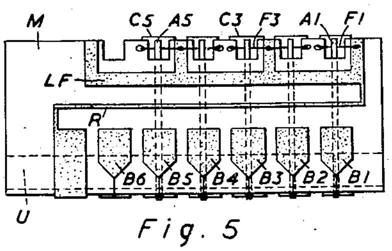
Figures 5 and 6 are plan and inverted plan views, respectively, of one form of switching device according to the invention using "printed circuit" technique, Figure 7 being a "developmental" view of the circuit as initially printed on a piece of sheet material and Figure 8 being a fragmentary enlargement of Figure 3.
Figure 6:
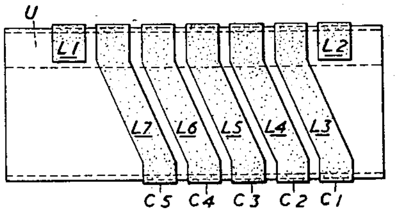

As stated above the switching device of Figures 3 to 8 is designed for use as a plug-in unit for an aircraft rocket projector for closing the firing circuits which are connected with a holder on the projector having connections for said circuits and for a battery or other source, and also having resilient or spring contacts for establishing connection with the plug-in switching device at the places marked $L_1$, $L_2$, Figure 6, and $B_1$, $B_2$, $B_3$, $B_4$, $B_5$ and $B_6$, Figure 5. It will be noted, however, that after use new fuse wire can, if desired, be fitted ready for a subsequent operation.

Figure 9:
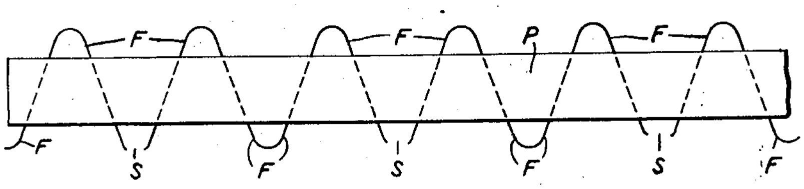
Figures 9 and 10 are face and end views, respectively, of a strip comprising a preformed series of fusible elements on a carrier.
Figure 10:
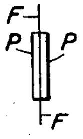
Figure 11:
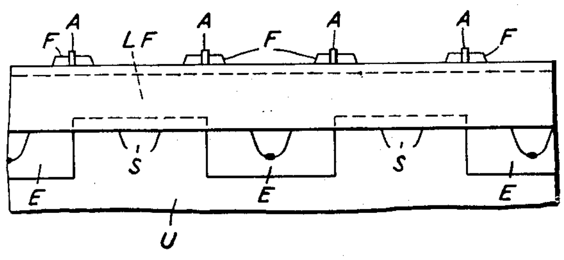
Figures 11 and 12 are fragmentary face and end views, respectively, showing the use of the fusible element strip of Figures 9 and 10.

Turning now to Figures 9 to 12 of the drawing, the initial assembly of the fusible elements $F_1$, $F_2$, . . . and their replacement and, indeed the construction of a device like that described with reference to Figures 3 to 8, may be simplified by the employment of fusible element strip as shown in Figures 9 and 10. This strip may be made in continuous lengths and supplied in rolls from which sections may be cut off as required. The strip comprises an initially continuous length of fuse wire bent into sinusoidal zigzag form and secured between two narrower strips P, P of paper or other nonconductive material (e. g. by means of heat and pressure between two strips of paper which has been treated with synthetic resin) alternate loops of the wire at one side of the strips P, P being severed as indicated at S.

Figure 12:
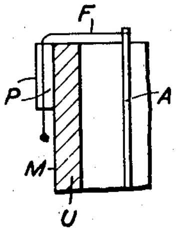

The use of the fusible element strip of Figures 9 and 10 enables the gapping of one margin of the U-section body shown in Figures 3 to 8 to be dispensed with. For example, see Figures 11 and 12 where the fusible element limbs of the wire are indicated simply by the letters F, F, . . ., the corresponding margin of the body U is left straight and has a "printed" lead corresponding to the lead LF of Figure 5 extending along it as shown in broken lines with extensions E, E, . . ., extending away from instead of towards the edge of the body U. A length of the fusible element strip is then secured, as by adhesive along the margin of the body U with the unsevered loop edge of the material P flush with the edge of the body U. The switch arms A, A, . . . being held clear by temporary means of the corresponding fixed contacts (not shown in Figures 11 and 12) the unsevered loops of wire are bent down at right angles over the ends of the arms A, A, . . ., as shown in Figure 12 and the temporary holding means are removed. The unsevered loops of wire at the inner side of the strip are soldered or spot-welded to the projections E of the lead LF and the severed ends are secured by adhesive as before.

Figure 13:
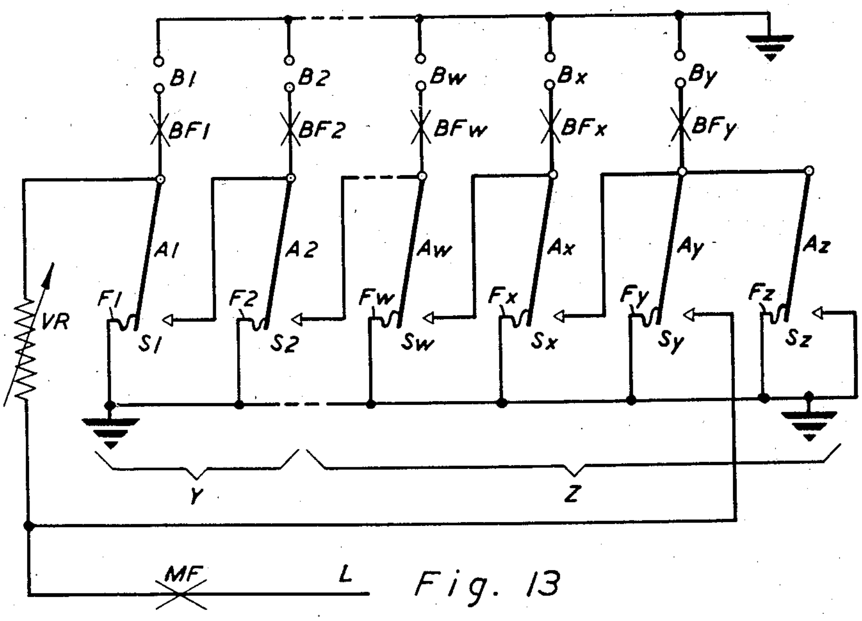
Figure 13 is another circuit diagram.

The circuit of Figure 13 also includes the basic circuit of Figure 1 but uses earth or ground returns equivalent to the lead $L_1$ in Figures 1 and 2, and has an additional fusible element switch which causes a main fuse to operate when all the other switches have closed for safety should the device be plugged into a rocket projector before new fusible elements have been fitted to hold the switches open.

The live supply lead (equivalent to $L_2$ in Figures 1 and 2) as indicated at L is connected through a main fuse MF and a variable resistance to the arms of the first switch S. So far as their earth return connections are concerned the switches are divided into two groups indicated by Y and Z each with its independent earth connection. This is to minimise the consequences of high resistance developing in one fusible element earth connection which, it will be seen, can result in only the corresponding switches Y or Z closing simultaneously. In some cases there may be more than two such individually earthed groups.

In operation, when the fusible element $F_x$ fuses and allows the switch $S_x$ to close, not only is the last branch circuit $B_y$ connected with the supply lead L but so also are the fusible elements $F_y$ and $F_3$ which fuse and allow the switches $S_y$ and $S_z$ to close and so connect the main fuse F to earth and so through said switches $S_y$ and $S_z$ only across the supply.

Switching devices according to the invention are capable of closing rocket firing or other circuits in succession at intervals of 10 milliseconds or longer and are found to be very reliable, there being no need with a 24 volt battery or source for an additional supply lead connection switch such as $S_x$ of Figure 2 even where there are so many as 9 circuits to be closed or otherwise modified, in succession.

It will be understood that any circuit fuses such as $BF_1$, $BF_2$, of Figure 2 will be such as to remain intact except in the case of a fault in such a circuit causing it to take too much current.

I claim:

1. An electric switching device comprising essentially a plurality of switches, a plurality of fusible elements holding them open against a spring influence, wherein each switch comprises a springy arm mounted rigidly at one end, and wherein each fusible element comprises a piece of fuse wire which the corresponding springy arm engages at its free end and by which said arm is held bowed or deflected in the open position; said fuse wire extending in a series of sinusoidal or zigzag loops between anchorages on the body of the device and the springy switch arms, each arm extending at its free end through a corresponding loop clear of the body of the device, alternate anchored loops on the body being connected together and the intervening anchored loops being severed and left unconnected; and connections such that, upon establishment of connection with a battery or other source, the first fusible element fuses and so allows the first switch to close and thus connect to the source the second fusible element which in turn then fuses and so allows the second switch to close and thus connect the third fusible element through the already closed first switch to the source, and so on, depending upon the number of switches in any particular case.

2. A switching device as claimed in claim 1, comprising an insulating body and a printed circuit, wherein the insulating body is of deep channel section, wherein the printed circuit is in thin sheet form wrapped around the channel section insulating body from the inside margin of the one lip of the channel where it presents plurality of fixed switch contacts, around said lip and the outside of the channel to the outside margin of the other lip, wherein a plurality of springy switch contact arms extend in parallel spaced relationship each from the base of the channel, where it is rigidly secured, between the two lips and by virtue of their springiness tend to bear upon the corresponding fixed switch contacts of the printed circuit, and wherein when the device is ready for use the springy switch contact arms are held clear of the fixed switch contacts by loops of fuse wire extending from the opposite lip of the channel section insulating body where they are secured in contact with the appropriate connection(s) of the printed circuit.

3. A switching device as claimed in claim 2, wherein the loops of fuse wire are secured to a thin insulating strip which is placed along the outer margin of the lip of the channel section body with said loops extending from both edges of the strip.

4. A fusible element strip for use in a switching device as claimed in claim 1, comprising a length of fuse wire bent into sinusoidal zigzag form and secured to an insulating strip so that the opposite bights of the wire extend from opposite edges of the strip, respectively, all the bights at one edge of the strip being left intact for co-operation with spring-influenced switch arms to hold them open and alternate bights at the other edge of the strip being severed.

References Cited in the file of this patent

UNITED STATES PATENTS

| | | |
|---|---|---|
| 500,248 | Young et al. | June 27, 1893 |
| 520,378 | Parson | May 22, 1894 |
| 708,329 | Egan | Sept. 2, 1902 |
| 817,959 | Craft | Apr. 17, 1906 |
| 913,913 | Prowse | Mar. 2, 1909 |
| 991,372 | Reid | May 2, 1911 |
| 2,779,014 | Mounce | Jan. 22, 1957 |

FOREIGN PATENTS

| | | |
|---|---|---|
| 369,419 | France | Dec. 10, 1906 |